United States Patent
Plog

(10) Patent No.: US 6,249,273 B1
(45) Date of Patent: *Jun. 19, 2001

(54) METHOD OF AND DEVICE FOR DISPLAYING CHARACTERS WITH A BORDER

(75) Inventor: Jürgen Plog, Hamburg (DE)

(73) Assignee: U.S. Philips Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,863

(22) Filed: Dec. 7, 1995

Related U.S. Application Data

(63) Continuation of application No. 08/152,567, filed on Nov. 12, 1993, now abandoned.

(30) Foreign Application Priority Data

Nov. 14, 1992 (DE) .................................. 42 38 547

(51) Int. Cl.⁷ ..................................................... G09G 5/22
(52) U.S. Cl. ........................................... 345/141; 345/144
(58) Field of Search .................................... 345/141, 127, 345/128–130, 144, 467–469, 470

(56) References Cited

U.S. PATENT DOCUMENTS

| | | | |
|---|---|---|---|
| 3,739,354 | * 6/1973 | LeRoy | 365/233 |
| 3,781,849 | * 12/1973 | Baron | 345/144 |
| 4,107,786 | * 8/1978 | Masaki | 345/128 |
| 4,794,451 | * 12/1988 | Suzuki | 345/144 |
| 5,003,303 | 3/1991 | Kellar et al. | 345/144 |
| 5,200,739 | * 4/1993 | Eland | 345/141 |
| 5,280,576 | * 1/1994 | Cao | 395/150 |

FOREIGN PATENT DOCUMENTS

0393756 * 10/1990 (EP) .
2-287496 * 11/1990 (JP) .

\* cited by examiner

Primary Examiner—Regina Liang
(74) Attorney, Agent, or Firm—Gregory L. Thorne

(57) ABSTRACT

It is often desirable to display characters with a border. This border is generated on-line in accordance with the invention in that for each instantaneous raster line preceding and succeeding raster lines are read and column-wise combined in conformity with the desired border, said combined information being step-wise delayed by a number of raster points. The delayed signals are combined in conformity with the side selected for the border and with the border width, and produce the border signal after suppression at the areas where character information is to be displayed. As a result, aribtrary character shapes can be provided with a selectable border, it only being necessary to store these character shapes without border. Also described is a simple device for carrying out such a method.

9 Claims, 3 Drawing Sheets

METHOD OF AND DEVICE FOR DISPLAYING CHARACTERS WITH A BORDER

This is a continuation of application Ser. No. 08/152,567, filed Nov. 12, 1993 now abandoned.

BACKGROUND OF THE INVENTION

The invention relates to a method of displaying characters with a border on a display device as a raster consisting of raster lines and raster columns, the character information being derived from a memory, as well as to a device for displaying characters with a border on a raster consisting of raster lines and raster columns, and comprising a data source for supplying the character information.

A method of this kind is known from U.S. Pat. No. 5,003,303. Therein, the character information for each raster point of the character contains a multidigit value. This value is transformed into a part of the overall value range, and in parallel therewith an expanded form of the character element is formed in the other part of the value range, for example in that for each raster field it is tested whether a character element is present within a matrix field of given size around the relevant raster field. After rotation or shifting of the character, if applicable, the two value ranges are separately backtransformed into the overall value range again, and a selectable colour is assigned to the border information. Finally, the overall character information with border is stored in an image memory wherefrom display takes place.

The image memory is necessary because the many processing steps required for each individual raster point of the character to be displayed cannot be executed at the display speed. Such an image memory, however, represents a substantial expenditure.

In order to save such a character memory, the image information of the characters to be displayed, for example letters or digits character-wise stored in a character memory and addressed by character codes, is read often in synchronism with the display on the display device, i.e. in synchronism with the deflection of the electron beam in the case of a picture tube. The characters are customarily reproduced in a selectable colour on a background which is also selectable. The background may also be transparent, for example when the characters are to be superposed on a television image in given positions. In case the colour of the image part on which the characters are to be superposed happens to be the same as the colour selected for the characters and the background of the characters is transparent, the characters displayed cannot be recognized.

One possibility of making the characters recognizable still on a background of arbitrary colour consists in providing the characters with a border on at least some sides; such a border is also referred to as a shade. This border is reproduced in a different colour, so that either the characters or the border can always be reliably recognized, regardless of the colour of the background. For other reasons, for example so as to achieve a more aesthetic display, it may also be desirable to display characters with a border. This border may be desired at one or two sides, for example at the top and at the right, so that it appears as a shade; however, it may also be desirable to provide a border at three or at all four sides.

Therefore, it is an object of the invention to provide a method of the kind set forth which enables the display of arbitrary characters with a minimum expenditure, notably without using an image memory, and with a border at arbitrarily selectable sides.

SUMMARY OF THE INVENTION

This object is achieved in accordance with the invention in that, in order to generate the border (shade) at selectable sides of the character, in synchronism with the raster points displayed a line signal is formed such that, for each raster line to be displayed, the character information of the relevant raster line is combined column by column with the character information of a first number of preceding and/or succeeding raster lines of the character in conformity with the sides selected for the border. Such line signal is column-wise delayed by up to twice a second number of columns. The first number denotes the height of the border in raster lines, and the second number denotes the width of the border in raster columns. There is also formed a character signal in which raster line information concerning the character to be displayed is delayed by said second number of columns. Finally, a shade signal is formed from the combination of differently delayed line signals in conformity with the sides selected for the border, the character signal then being suppressed from this combination and the shade signal generating a selectable colour at corresponding raster points of the raster line displayed.

Thus, the basic idea of the invention is to store only the basic shape of the characters and to add the border on-line during display; thus, in the case of periodic display such as on a picture tube the border is also generated periodically. First the information for an upper or lower edge is then generated, and therefrom the additional information for a left-hand or right-hand edge is formed. For the sake of simplicity, the border information is formed also for the raster point associated with the information of the basic character to be displayed, after which it is suppressed again by this character information. This results in a method which can be readily implemented to achieve selectable bordering of characters and which can also be used when the character information is pixel-wise stored, for example for an image part of a complete image.

It is often desired to display selectable characters with a different size, for example double the height, double the width or twice the overall size. For a better image presentation such characters are then displayed with a border which is wider than that of characters of normal size. Therefore, a version of the method in accordance with the invention is characterized in that, for the purpose of selection of different border widths, the first number corresponds to the selected border width and the second number corresponds to the maximum border width, and the delayed line signals are combined in conformity with the selected border width and the selected side for the border in order to form the shade signal. The border width is thus also variable within a line of characters or also within a raster line.

It is to be noted that for a border the number of lines for the upper or the lower edge may differ from the number of raster points for the side edges, i.e. the first and the second number are different.

A display device of comparatively simple construction suitable for carrying out the method in accordance with the invention by controlling the display of characters on a raster consisting of raster lines and raster columns, and comprising a data source for supplying the character information in synchronism with the raster points displayed, in accordance with the invention is characterized in that the following elements are provided for the display of characters with a border (shade) at selectable sides of the characters:

a) a control device which reads from the data source, for each raster line of a character to be displayed, also the information of a first number of preceding and/or succeeding raster lines of the character corresponding to the border width, in conformity with the sides selected for the border, b) a combinatory device which combines the information of corresponding columns of the individually read raster lines of the character so as to form a line signal, c) a first delay device which delays the information of the instantaneous raster line to be displayed by a second number of columns which corresponds to the border width and outputs it as a character signal, d) a second delay device which delays the line signal by up to double the second number of columns and outputs it column-wise, e) a combination device which combines the column-wise delayed line signals in conformity with the sides selected for the border, f) a suppression device which suppresses the combined, delayed line signals upon occurrence of a character signal and which applies the non-suppressed signal as a shade signal to the display device in order to produce a selectable colour at the relevant raster points.

With the exception of the control device, all other devices have a very simple construction, because essentially only a single bit-serial signal is to be processed. Superposition of characters on, for example a television image already requires a control device which may be constructed as a microprocessor, possibly with special features, so that this control device can also be readily used for controlling the border, notably for reading the separate raster lines, possibly after addition of a counter for counting the raster lines to be read.

An embodiment of the display device in accordance with the invention is characterized in that for the display of the border with a selectable width, the first number corresponds to the selected border width and the second number corresponds to the maximum border width, the combination device combining column-wise delayed line signals selected in conformity with the selected border width. The width of the border can thus be readily controlled, for example for characters of different size.

The essential parts of the display device operate at a clock frequency which corresponds to the frequency of the raster points on the display device, for example 12 MHz, this is not problematic for gates and flip-flops in customary digital techniques. Merely the access to the data source, for example formed by a character memory wherefrom several lines of a column must then be read within a period determined by said frequency, is hardly feasible for memories available at present. Therefore, customarily a third number of raster columns of a raster line are already read in parallel from the character memory so as to display the characters themselves, without a border, said parallel information being converted into serial information by a parallel-series converter. The memory access frequency is thus reduced in proportion to the third number of raster columns read in parallel. To this end, an embodiment of the display device in accordance with the invention is characterized in that the combinatory device comprises the third number of storage registers, each of which is preceded by a respective OR-gate, a first input of each OR-gate being connected to the output of the associated storage register and a second output of each OR-gate being connected to an input for respective parallel information of the raster columns, the outputs of the storage registers being connected to a parallel-series converter whose serial output is connected to the second delay device. Because the essential means of the display device in accordance with the invention are included in the storage elements constructed as flip-flops, a substantial saving is achieved in that only storage registers for a single raster line are required for buffering the plurality of raster lines, for example read from the character memory.

BRIEF DESCRIPTION OF THE DRAWINGS

Embodiments of the invention will be described in detail hereinafter with reference to the drawing. Therein.

DETAILED DESCRIPTION OF THE PREFERRED

Figure 1A:
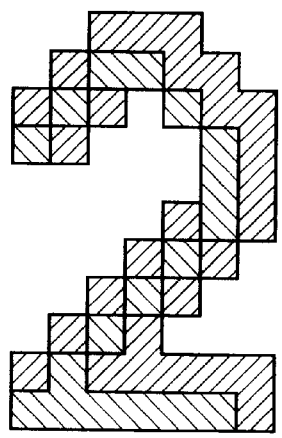
FIGS. 1a and 1b show two examples of a character with a border.

FIG. 1a shows the digit "2" in a raster-like representation, the raster points being crosshatched. This character is provided with a border at the upper and the right-hand side; this border also has a width of one raster point. This means that each raster point above and to the right of a pixel as well as diagonally to the right above a pixel represents a border point. In the case of colour display, the pixels and the border points have a different colour; in the case of monochrome display, they have different brightness values. Characters are often displayed in practice by means of a larger number of points, i.e. with a higher resolution, and the border may have a width of more than one raster point even for characters of single width.

Figure 1B:
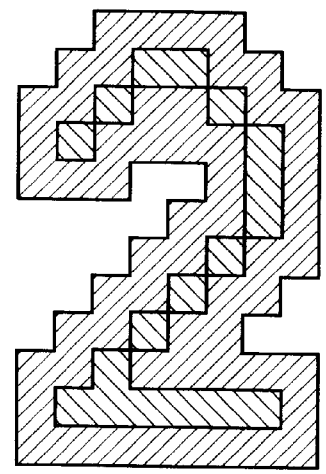

All four sides of the digit "2" shown in FIG. 1b, are provided with a border and, moreover, each raster point diagonally situated relative to a character point belongs to the border when this point itself is not a character point.

The formation of a border as shown in FIG. 1a will be described with reference to FIG. 2a. Therein, the top part shows two raster lines of a character or a part of a character; in the upper line n, indicating the raster line to be displayed, a character point is indicated and the subsequent raster line n+1 also indicates a character point, be it a diagonally offset point.

Figure 2A:
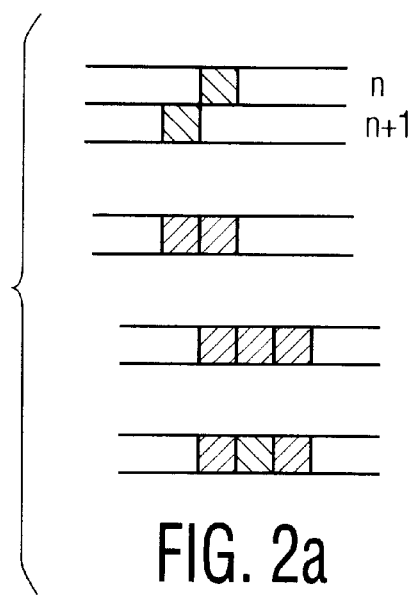
FIGS. 2a and 2b show diagrammatically the step-wise building up of the border information.

The next line in FIG. 2a shows the combination of these two character points, that is to say an OR-combination in respect of character information. This information will be referred to hereinafter as a line signal.

The third line of FIG. 2a shows an OR combination of: the line signal delayed by two raster points in conformity with the doubled borber width, the line signal delayed by one raster point. The non-delayed line signal is not contained therein, because no border is to be displayed at the left-habd side of the character. This combined signal is essentially the border signal for a border, as shown in FIG. 1a, in that this borber signal is also available at the area of the actual character information.

In the last line of FIG. 2a, the raster point with the character information of the upper line n, delayed by one raster point in conformity with the single border width, has been removed from the combined signal and replaced by this character information. This represents the information applied to the display device, as can be recognized in the central, oblique part for the digit in FIG. 1a.

Figure 2B:
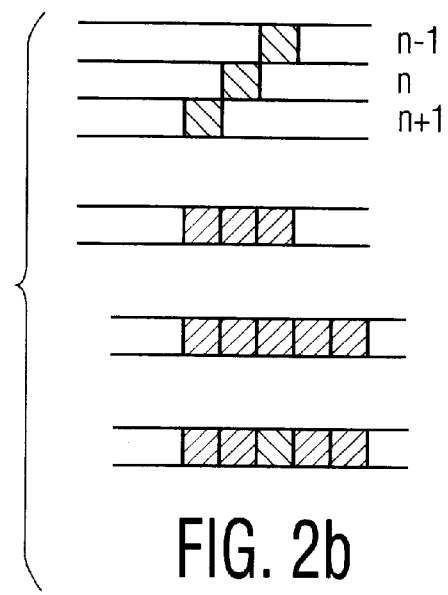

In FIG. 2b the corresponding conditions are given for a complete border at all four sides as shown in FIG. 1b. Thus, for each line n to be displayed the preceding raster line n−1 and the subsequent raster line n+1 are applied. The next line in FIG. 2b again shows the line signal as a combination of all three character data.

The third line of FIG. 2a shows an OR combination of: the line signal delayed by two raster points, the line signal delayed by one rater point, and the non-delayed line signal. The non-delayed line signal is included because, in this case, the left-handed and the right-hand side of the character are to be provided with border information. Finally, in the last line of FIG. 2b the central raster point has been replaced by the line information of the line n, delayed by one raster point.

The selected character sides with border information are thus generated directly during application to the display device, so that only the character information itself without border, need be stored. This method of generating the border is very flexible, because desired borders can be formed by control of the reading of the respective preceding and/or subsequent raster line and by combination with appropriately delayed and non-delayed signals. This also holds for the upper or lower edge of a character, as can be readily understood since, for example upon display of the line directly above a character, where a border is to be displayed, the raster lines n−1 and n do not contain character information, so that the combination forming the line signal contains only the information of the raster line n+1, i.e. the upper line of the character to be displayed.

Figure 3:
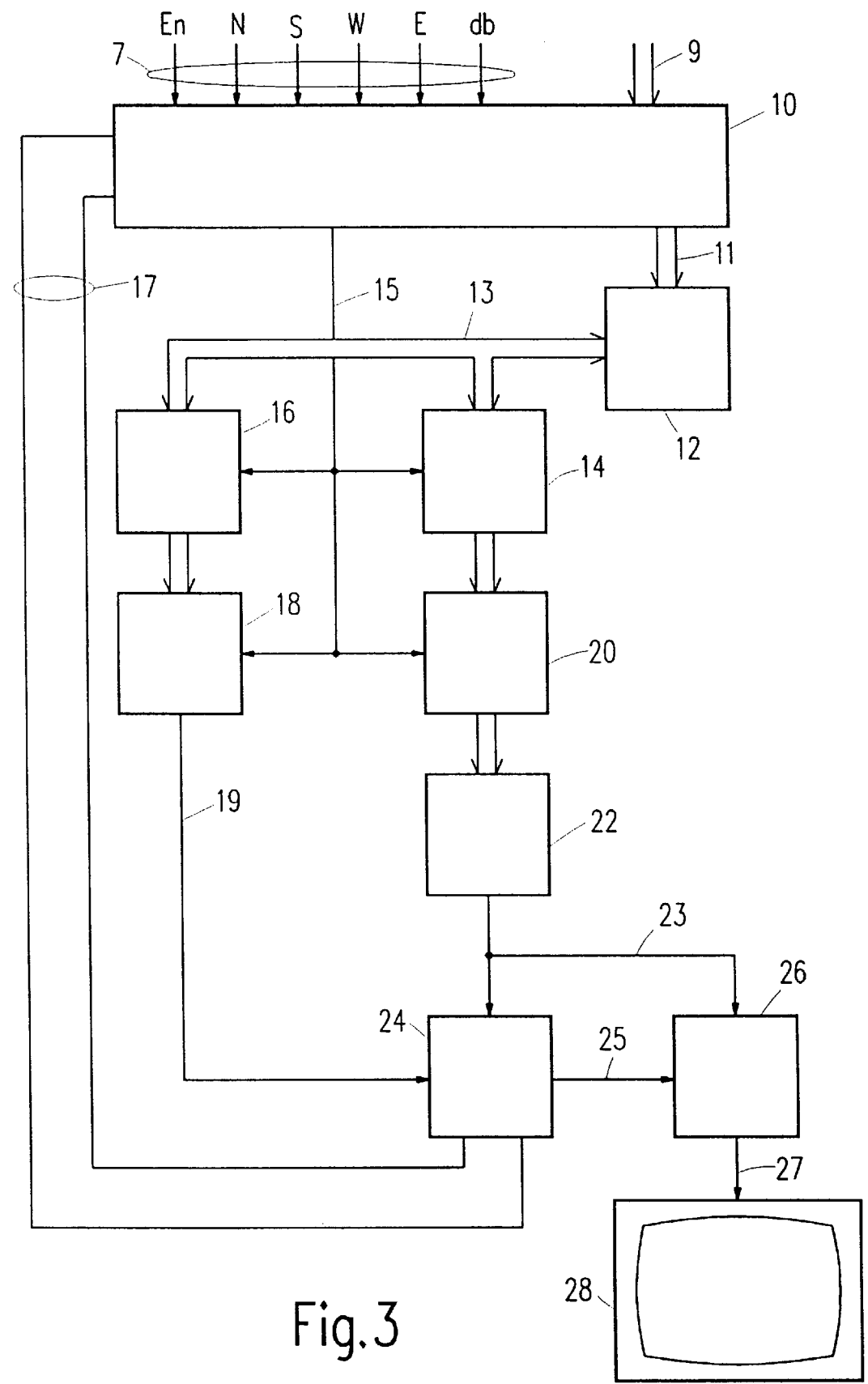
FIG. 3 shows a block diagram of a display device in accordance with the invention.

FIG. 3 shows a circuit arrangement for generating the border information in conformity with the described method. A control device 10, which may be a microprocessor and which is capable of also executing further functions, receives a number of control signals required for generating the border information. The bundle 7 comprises first of all a lead En which indicates whether the generating of the border information is to be enabled. Thus, it can be chosen whether individual characters are to be displayed with a border whereas other characters in the same image are to be displayed without a border. The next four leads N, S, W and E indicate which side of the character is to be provided with a border, the designations of the leads being derived from the conventional geographical directions. Therefore, N means "north" and indicates that at the upper edge of each character element a border is to be provided, etc. The lead db indicates that a border of double width is to be provided. This is effective notably for characters which are to be displayed at an enlarged scale in at least one direction. Via the multiple lead 9, the address of the instantaneous line is applied in parallel to the control device, which address indicates which character line is to be read from a character generator. The further control of the character generator, i.e. by the character itself, is not shown because it is generally known and does not form part of the invention. Further control signals, notably the clock signal, have also been omitted for the sake of clarity.

From the signals supplied the control device 10 generates a number of further control signals which are output via the connections 15 and 17 and which will be described in detail hereinafter. On an output 11 the control device 10 also generates in parallel the addresses of the raster line to be read from a data source 12 containing the character information, for example by means of a counter (not shown) which is set to an address of the current raster line, decreased in conformity with the border width, and subsequently is incremented to read a raster line from the data source 12 in each position. For the sake of simplicity, it will be assumed hereinafter that the data source 12 is a conventional character generator which contains the character information in the form of raster lines and raster columns, each time a complete raster line of a character being read and output via an output 13.

The parallel information of the raster line is applied, via the connection 13, to two devices 14 and 16. The device 14 is a register which stores the character information of the current line to be displayed, i.e. by way of a corresponding control signal from the control device 10, via the connection 15, which control signal is generated when the relevant raster line is read from the character generator 12. The device 16 comprises a circuit which is referred to as a north-south logic circuit and which ensures that the character information of the raster lines successively supplied in addition to a line to be displayed are column-wise combined in an OR-like manner. This takes place under the control of control signals received via the connection 15. The raster lines which are to be read and supplied in addition to the raster line to be directly displayed can be selected in that via the connection 15 only the corresponding ones of the supplied raster lines are taken over in conformity with the signals on the leads N and S as well as db, each time the maximum number of raster lines for the widest border being read, or the control device generating only the corresponding addresses at the output 11 in dependence on the signals on said leads.

The character information, stored in the register 14, of a raster line of the character to be displayed as well as the combined character information stored in the device 16 is applied to a series-parallel converter 18, 20, respectively, in which it is written by way of a corresponding signal, via the connection 15. This takes place whenever the processing of the corresponding raster line of the preceding character has been terminated. The parallel-series converters 18 and 20 subsequently output the information at the rate of display of the individual raster points on a display 28.

The serial information of the converter 20 is applied to a delay device 22 in which this information is delayed by a number of clock periods which corresponds to the maximum width of the lateral border. The delayed signal is output via the lead 23, that is to say inter alia to a device 24 which is referred to as an east-west logic circuit because it serves to generate the left and right borders. The side for the border and its width are selected by the control device 10, via the control signals on the leads 17. The east-west logic circuit 24 comprises notably a delay device which delays the serial information of the converter 18, output via the lead 19, by double the maximum width of the east-west border and which combines the delayed signals in conformity with the control signals on the lead 17. From the combined signal the character information supplied via the lead 23 is extracted. The resultant signal constitutes the border information which is applied to a device 26 via the lead 25. This device also receives the delayed character information via the lead 23.

From the signals on the leads 23 and 25, the device 26 generates the corresponding colour information for the display device 28 which colour information appears on the lead 27 in composite form. Additionally, in the device 26 a colour image signal originating from a source (not shown), for example a receiver for colour television signals, can be superposed on said colour information.

Figure 4:
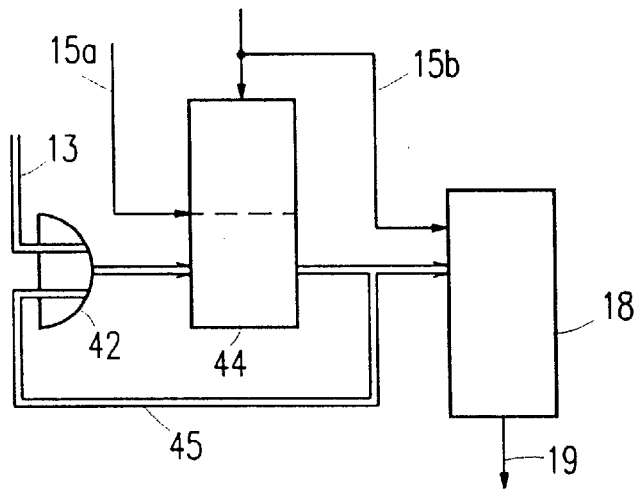
FIGS. 4 and 5 are more detailed representation of the construction of some blocks.

FIG. 4 is a more detailed representation of the construction of the logic circuit 16. As has already been stated, the connection 13 comprises a number of leads, each lead being associated with a column of a character or character field, so that the information of a raster line of a character is supplied in parallel for successive columns along said line. Each lead of the connection 13 is connected to one input of its respective OR-gate 42, being shown as only one gate for the sake of simplicity in FIG. 4. The output of each OR-gate 42 is connected to the data input of a respective register stage 44, again shown only as a single stage. The output 45 of each register stage is connected to a second input of the associated OR-gate 42, the outputs of all registers being connected to a parallel input of the parallel-series converter 18. For example, assuming that a raster line of a character contains 12 raster points, 12 OR-gates 42 and 12 register stages 44 will then be present, and the parallel-series converter 18 will convert a word having a width of 12 bits into a serial data stream.

The information of each of the successively supplied raster lines is thus OR-wise combined, via the OR-gates, with the previous contents of the associated register stage 44 so as to be written into the associated register stage again by way of a signal on the lead 15a. The lead 15a forms part of the connection 15 in FIG. 3 and receives a signal for the information of each raster line to be actually used. For example, the information of the raster lines can be selected for the desired border also when the information of the maximum number of raster lines for the widest border is supplied via the connection 13.

When all raster lines for the border have been supplied, each register stage 44 contains the logic combination of a column from all raster lines. When the information of the raster line of the preceding character has been completely processed, i.e. completely output by the parallel-series converter 18 via the serial output 19, a signal appears on the lead 15b which takes over the information of all register stages 44 in the parallel-series converter 18 and simultaneously erases all register stages. Subsequently, the information taken over is serially output again by the parallel-series converter 18 via the lead 19.

Figure 5:
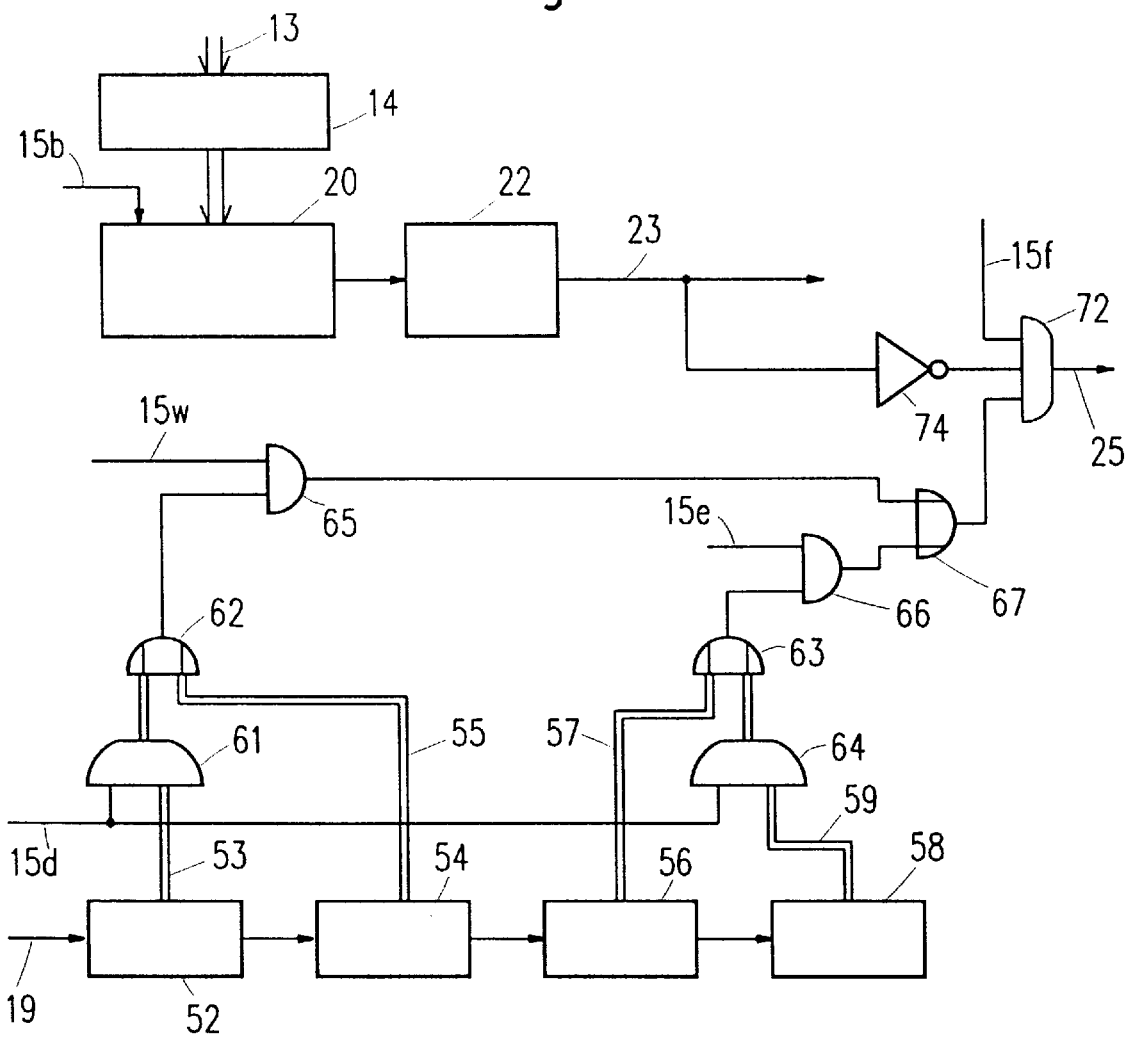

The construction of the east-west logic circuit 24 is shown in detail in FIG. 5. The line information arriving via the lead 19 is applied to a chain of delay devices 52, 54, 56 and 58 in which this information is shifted further at the rate of the raster points of the display device. The sum of the delays of the devices 52 and 54 equals the sum of the delays of the devices 56 and 58, corresponding to the widest border which is assumed to have double the width. Each of the delays of the devices 54 and 56 corresponds to the single border width.

Each delay device thus comprises a number of delay stages which corresponds to the number of columns whereby the line signal is delayed by the device. The output signals of all delay stages of a device are fed out in parallel, that is to say via the connection 53 in the device 52. Each lead of this connection is connected to an input of a respective AND-gate 61, and a further input of all AND-gates 61 is connected to a control lead 15d which indicates whether the border is to be displayed in single or double form. The output of each AND-gate 61 is connected to an input of an OR-gate 62. The delay stages of the device 54, fed out in parallel via the connection 55, are connected directly to a respective input of the OR-gate 62. The output of this gate is connected to an input of an AND-gate 65, the other input of which is connected to a control lead 15w which also forms part of the connection 15 in FIG. 3.

Similarly, the outputs of the delay stages in the delay device 58 are connected, via the connection 59, to an input of a respective AND-gate 64, the other input of which is also connected to the control lead 15d. The outputs of the AND-gates 64 are connected to a respective input of an OR-gate 63, the other inputs of which are connected directly, via the connection 57, to the outputs of the individual delay stages of the device 56. The output of the OR-gate 63 is connected to an input of an AND-gate 66, the other input of which is connected to a control lead 15e which also forms part of the connection 15 of FIG. 3. The outputs of the AND-gates 65 and 66 are connected to a respective input of an OR-gate 67 whose output thus carries a signal as shown on the second line from the bottom in FIGS. 2a and 2b respectively.

The circuit for generating the character signal in FIG. 3 is shown in slightly greater detail in the upper part of FIG. 5. The register 14 receives the character information of the raster line of the character to be displayed, supplied via the input 13, and this information is stored therein. Using the same signal on the line 15b whereby the information of the register stages 44 in FIG. 4 is taken over in the parallel-series converter 18, the contents of the register 14 are taken over in a parallel-series converter 20, after which the contents are serially read. This serial information is applied to the delay stage 22 which outputs the signal as the character signal on the line 23, delayed by a number of raster points equal to the sum of the delays in the delay devices 52 and 54. This character signal is applied, via an inverter 74, to an input of an AND-gate 72 whose other input receives the output signal of the OR-gate 67. When it is assumed for the time being that the signal on the line 15f enables the AND-gate 72, the border signal appears on the lead 25. The signal on the lead 15f, also belonging to the connection 15 in FIG. 3, enables control so that, for example for some characters a border is displayed that for other characters the border signal is suppressed.

Because the delay of the delay device 22 equals the sum of the delays of the devices 52 and 54, at the outputs 55 a border signal appears which leads the actual character information by one or more raster points. Due to the combining of these outputs in the OR-gate 62, the output thereof carries a chain of raster point signals which lead the character signal and, when the signal on the lead 15w enables the AND-gate 65, the border signal for the left-hand side is thus generated via the OR-gate 67. Analogously, at the outputs 57 of the delay device 56 border signals appear which lag the character signal and, when the signal on the lead 15e enables the AND-gate 66, the chain of lagging raster point signals is generated at the output 25, via the OR-gate 67, as the border signal for the right-hand side. When both leads 15e and 15w carry a high signal, a border is generated to both sides of a character point.

A high signal on the lead 15d enables the AND-gates 61 and 64, each of which in reality consists of a number of individual gates which corresponds to the number of leads in the connections 53 and 59, respectively, and at the output of the OR-gates 62 and 63 a correspondingly longer chain of leading and lagging, respectively, raster point signals appears, resulting in a correspondingly wider border in the image. The width of the border can thus be determined by means of the signal on the lead 15d. The control lead 15d may also be separate for the two groups of AND-gates 61 and 64, so that the width of the border can be switched over within a character, for example from single to double width.

The described display device thus enables flexible display of borders of characters, without it being necessary to modify the actual character information, for example without requiring separate storage of the characters with border information.

What is claimed is:

1. A method of displaying on a display device a character having a border on at least one selectable side thereof, the character being formed by a raster having a plurality of raster lines and raster columns containing character information; said method comprising the steps of:

generating a line signal for each raster line by combining the character information for each raster line, column by column, with the character information of a first predetermined number of preceding and/or succeeding raster lines;

delaying the line signal by no more than twice a second predetermined number of columns, wherein said first predetermined number is selected independently of said second predetermined number;

generating a character signal by delaying each raster line of said character by based on the second predetermined number of columns; and combining the delayed line signal and the character signal to generate said character and the selected border.

2. The method of claim 1, wherein the first predetermined number represents the number of raster lines in the border height and the second number represents the width of the border in raster columns.

3. The method of claim 1, further including the step of further delaying the line signal up to twice a third predetermined number of columns corresponding to a maximum border width for generating a border having varying width.

4. A display device for generating a display of a character having a selectable border, said character having character information in a plurality of raster lines and raster columns which form said character; said display device comprising:

control means for receiving raster line signals indicative of the character information on a first raster line and on a first predetermined number of further raster lines preceding and/or succeeding said first raster line of the character;

first combining means coupled to and controlled by the control means for forming a first line signal by combining the raster line signals received by the control means;

a first delay circuit coupled to the control means for delaying the first line signal based on a second predetermined number of raster columns, to produce a character signal;

a second delay circuit coupled to the first combining means for delaying the first line signal by no more than twice the second predetermined number of raster columns to produce column-wise delayed line signals, wherein said first predetermined number is independent of said second predetermined number;

second combining means responsive to a border select signal for combining the column-wise delayed signals; and suppressing means coupled to the first delay circuit and the second combining means for suppressing the combined column-wise delayed line signal, first line signal upon detecting character information character signal.

5. The device of claim 4, wherein the first predetermined number represents the number of raster columns in the border width and the second predetermined number represents the number of raster lines in the border height.

6. The device of claim 4, wherein the first combining means includes, for each column in each raster line;

an OR-gate having a first input for receiving one column of the first raster line, a second input and an output;

a storage register having an input coupled to the output of the OR-gate and an output coupled to the second input of the OR-gate; and a parallel-to-series converter having an input coupled to the storage register and an output coupled to the second delay circuit.

7. The device of claim 6, further including a display for displaying the character and the border.

8. The device of claim 4, wherein the first delay circuit delays the raster line by a third predetermined number which corresponds to a maximum border width and the second delay circuit delays the line signal by no more than double the third predetermined number of columns.

9. The devices of claim 4, further including a character generator for generating the character information.

* * * * *